United States Patent
Schneider et al.

(10) Patent No.: US 11,691,720 B2
(45) Date of Patent: Jul. 4, 2023

(54) PITCH CHANGE LINKAGE

(71) Applicant: Bell Textron inc., Fort Worth, TX (US)

(72) Inventors: Gerard Michael Schneider, Azle, TX (US); Lawrence Michael Petsch, Azle, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 338 days.

(21) Appl. No.: 17/029,569

(22) Filed: Sep. 23, 2020

(65) Prior Publication Data

US 2021/0380232 A1  Dec. 9, 2021

Related U.S. Application Data

(60) Provisional application No. 63/034,372, filed on Jun. 3, 2020.

(51) Int. Cl.
  *B64C 27/78*  (2006.01)
  *B64C 27/59*  (2006.01)
  *B64C 27/72*  (2006.01)

(52) U.S. Cl.
  CPC ............ *B64C 27/78* (2013.01); *B64C 27/59* (2013.01); *B64C 27/72* (2013.01)

(58) Field of Classification Search
  CPC .......... B64C 27/78; B64C 27/59; B64C 27/72
  See application file for complete search history.

(56) References Cited

U.S. PATENT DOCUMENTS

| | | | | |
|---|---|---|---|---|
| 2,488,775 | A * | 11/1949 | Heim | F16C 11/0614 |
| | | | | 29/898.1 |
| 2,804,679 | A * | 9/1957 | Tracy | F16C 11/0614 |
| | | | | 29/520 |
| 3,227,005 | A * | 1/1966 | Johnson | F16H 13/00 |
| | | | | 475/196 |
| 3,317,256 | A * | 5/1967 | Ernest | F16C 23/045 |
| | | | | 29/520 |
| 4,196,503 | A * | 4/1980 | McCloskey | B23P 15/003 |
| | | | | 29/898.047 |
| 4,392,753 | A * | 7/1983 | Abel | F16C 23/045 |
| | | | | 384/912 |
| 4,969,754 | A * | 11/1990 | Rohrer | F16C 19/548 |
| | | | | 384/537 |
| 5,186,686 | A * | 2/1993 | Staples | F16D 3/62 |
| | | | | 464/69 |
| 5,431,540 | A * | 7/1995 | Doolin | F16C 7/06 |
| | | | | 416/168 R |
| 5,727,926 | A * | 3/1998 | Ide | B64C 27/72 |
| | | | | 416/114 |
| 10,308,356 | B2 * | 6/2019 | Hampton | B64C 27/82 |
| 10,851,838 | B2 * | 12/2020 | Lawrence | F16C 27/063 |
| 11,142,300 | B2 * | 10/2021 | Cravener | B64C 27/80 |

(Continued)

*Primary Examiner* — Justin M Benedik
(74) *Attorney, Agent, or Firm* — Pramudji Law Group PLLC; Ari Pramudji

(57) ABSTRACT

A pitch change link may include a shaft having a first end region and a second end region, and a bearing cartridge on at least one of the first end region and the second end region. The bearing cartridge may include a bearing and a bearing ring at least partially surrounding the bearing. The bearing ring may have a geometric symmetry and a cross section that is wider at a first end than at a second end, the first end may oppose the second end.

20 Claims, 7 Drawing Sheets

(56) References Cited

U.S. PATENT DOCUMENTS

| | | | | |
|---|---|---|---|---|
| 2008/0023586 A1* | 1/2008 | Russell | .................... | F16C 7/04 |
| | | | | 244/131 |
| 2009/0205404 A1* | 8/2009 | Swadling | .............. | G01M 13/04 |
| | | | | 73/7 |
| 2011/0278778 A1* | 11/2011 | Qattan | ...................... | F16F 3/00 |
| | | | | 267/171 |
| 2015/0239555 A1* | 8/2015 | Foskey | ................... | B64C 11/04 |
| | | | | 416/134 A |
| 2018/0141650 A1* | 5/2018 | Hampton | ................ | B64C 27/82 |
| 2019/0100300 A1* | 4/2019 | Haldeman | ............... | B64C 27/48 |
| 2021/0270312 A1* | 9/2021 | Thompson | ................ | F16B 7/06 |

\* cited by examiner

PITCH CHANGE LINKAGE

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Rotary wing aircraft pitch change links have a life limit of about two hundred flight hours. A primary reason for failure of a pitch change link is erosion and wear of the pitch change link bearing liner. Bearings are under constant compression and tension loads during operation and at rest, the loads are primarily focused in approximate 12 o'clock and 6 o'clock orientations of the bearing relative to a longitudinal axis of the pitch change link. Over time, the compression and tension loads affect the integrity of the bearing liner, causing wear and eventual failure.

Prior solutions consist of new materials such as ceramic bearings, cartridge type bearings that enable the replacement of only the bearing and not the entire rod end.

SUMMARY

This disclosure is generally in the field of rotary wing aircraft pitch change links. The present disclosure describes increasing life of a pitch change link. More specifically, the present disclosure relates to a pitch change link having a bearing cartridge on at least one end region thereof. The bearing cartridge may include a spanner nut and a bearing.

Implementations of the present subject matter may be directed toward a pitch change link. The pitch change link may include a shaft having a first end region and a second end region, and a bearing cartridge on at least one of the first end region and the second end region. The bearing cartridge may include a bearing and a bearing ring at least partially surrounding the bearing. The bearing ring may have a geometric symmetry and a cross section that is wider at a first end than at a second end, the first end may oppose the second end.

Another implementation is directed to a method for increasing life of a bearing cartridge for a pitch change link, which may include manufacturing a pitch change link having the bearing cartridge. The bearing cartridge may include a bearing and a bearing ring at least partially surrounding the bearing. The bearing ring may have substantial geometric symmetry and a cross section that is wider at a first end than at a second end. The first end may oppose the second end. The method may further include removing the bearing cartridge from the pitch change link, rotating the bearing cartridge relative to the pitch change link, and attaching the rotated bearing cartridge to the pitch change link. The spanner nut may lock the bearing in place by interaction of threads on the spanner nut with threads on the bearing cartridge.

Various implementations of the present disclosure are also suitable for aerospace transparencies in applications that have similar rotorcraft type performance requirements such as small fixed wing aircraft. Implementations may also be applicable to other control tubes and/or linkages that incorporate fixed bearings.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
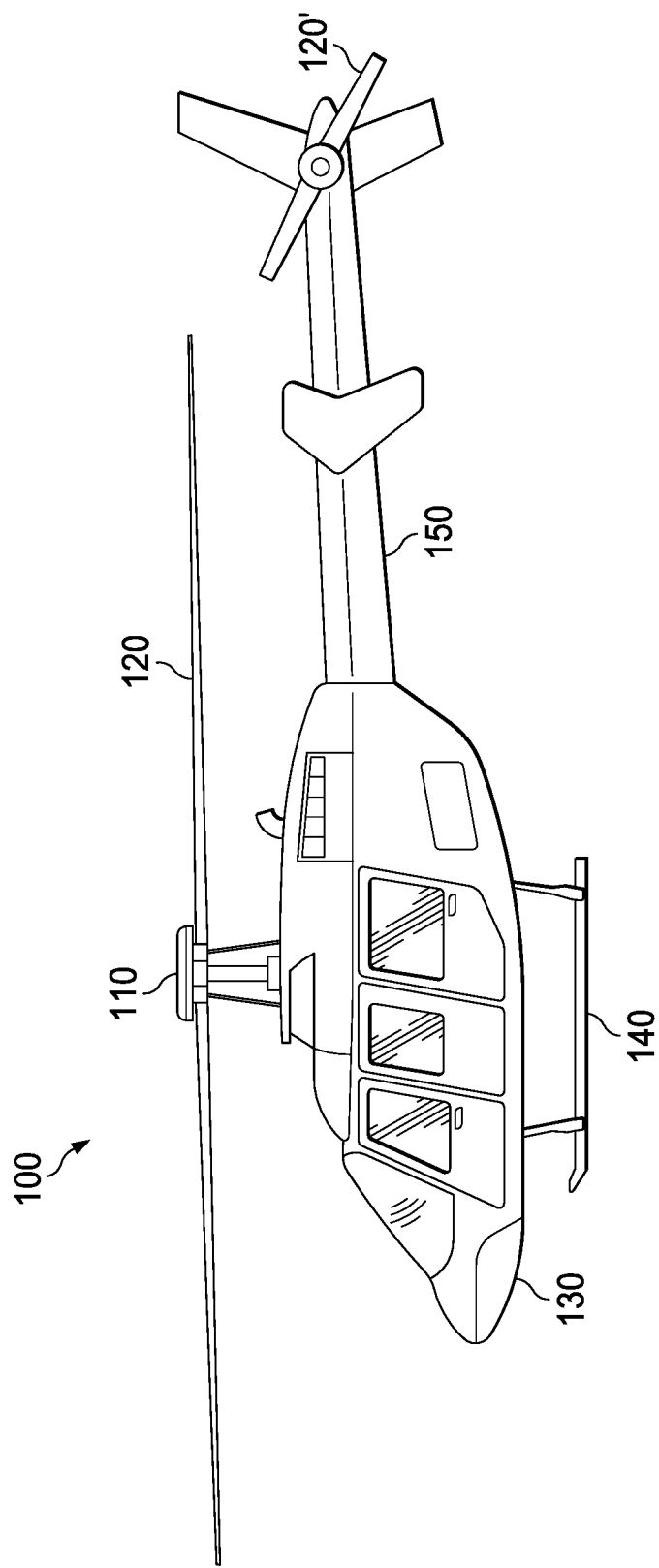
FIG. 1 illustrates a rotary wing aircraft having multiple blades according to an example implementation described herein.

FIG. 1 illustrates a rotorcraft 100, i.e., a rotary wing aircraft. Rotorcraft 100 features a rotor system 110, blades 120, a fuselage 130, landing gear 140, and an empennage 150. Rotor system 110 may rotate blades 120. Rotor system 110 may include a control system for selectively controlling the pitch of each blade 120 in order to selectively control direction, thrust, and lift of rotorcraft 100.

Empennage 150 represents the tail section of the aircraft and features components of a rotor system 110 and tail blades 120'. Tail blades 120' may provide thrust in the same direction as the rotation of blades 120 to counter a torque effect created by rotor system 110 and blades 120. Teachings of certain implementations relating to rotor systems described herein may apply to rotor system 110 and/or other rotor systems, such as other tilt rotor and helicopter rotor systems.

Figure 2:
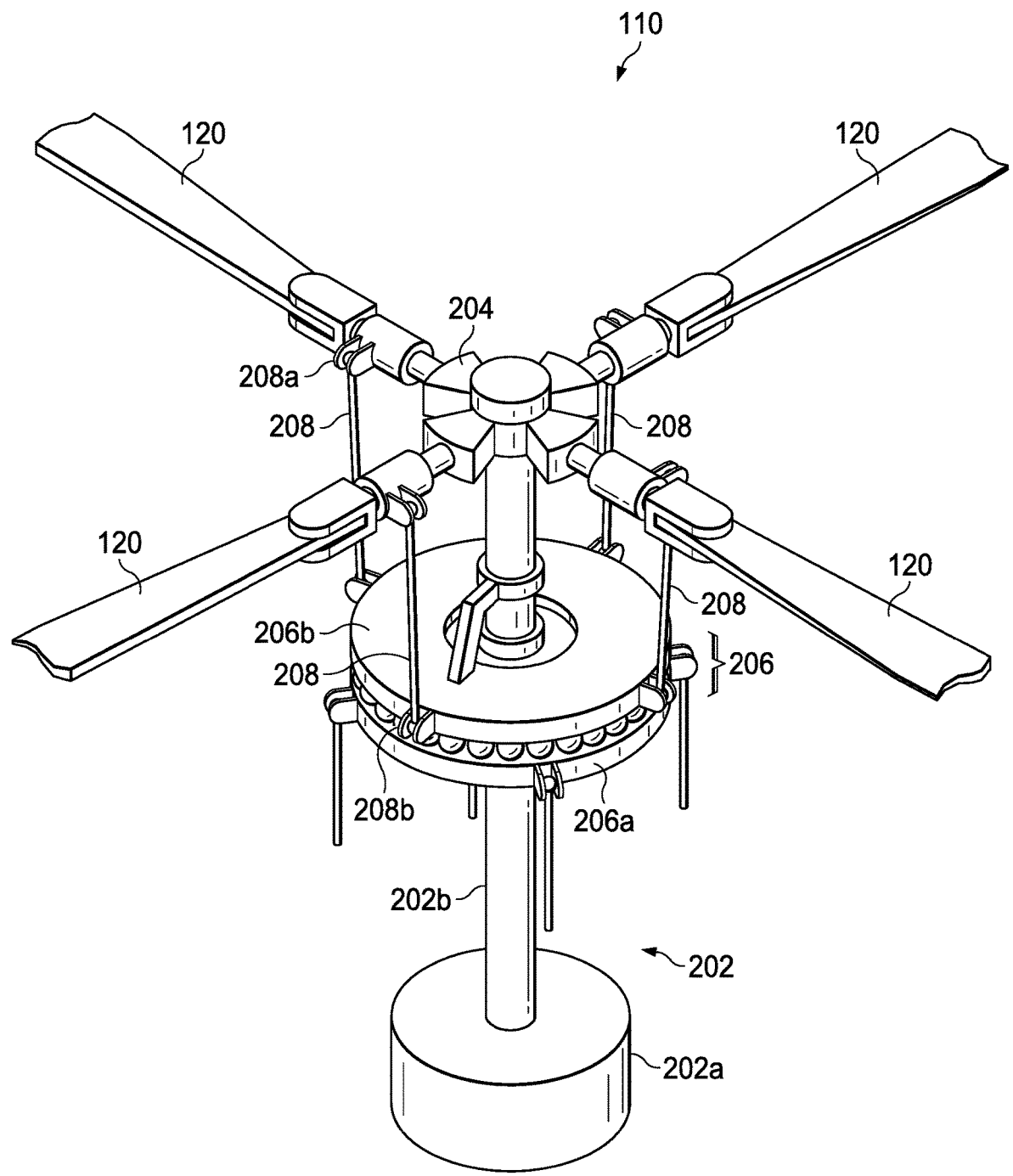
FIG. 2 illustrates a rotor system of the rotary wing aircraft of FIG. 1.

FIG. 2 shows the rotor system 110 and blades 120 of FIG. 1 according to one example implementation. In the example of FIG. 2, rotor system 110 features a power train 202, a rotor hub 204, a swashplate 206, and pitch change links 208. In some examples, rotor system 110 may include more or fewer components. For example, FIG. 2 does not show components such as a gearbox, drive links, drive levers, and other components that may be incorporated.

The power train 202 may feature a power source 202a and a drive shaft 202b. Rotation of the rotor hub 204 causes blades 120 to rotate about the drive shaft 202b. The swashplate 206 translates rotorcraft flight control input into motion of blades 120. In some examples, the swashplate 206 may include a non-rotating swashplate ring 206a and a rotating swashplate ring 206b. In the example of FIG. 2, the pitch change links 208 connect rotating swashplate ring 206b to blades 120.

In the example of FIG. 2, pitch change links 208 couple rotating swashplate ring 206b to blades 120. Pitch change links 208 may be subject to various forces at the connection points 208a and 208b, at which the pitch change link connects to blades 120 and to swashplate ring 206b, respectively, such as torsional, radial, axial, and cocking forces. Teachings of certain implementations recognize the capability to provide a bearing that protects against some or all of these forces.

According to one example implementation, translating the non-rotating swashplate ring 206a in a motion parallel with a longitudinal axis of drive shaft 202b causes the pitch change links 208 to move up or down. Movement of the pitch change links 208 translates movement from the swashplate 206 to the respective blades 120. This translated movement through the pitch change link 208 tilts respective blades 120 and changes the pitch angle of all blades 120 correspondingly. Tilting the non-rotating swashplate ring 206a causes the rotating swashplate 206b to tilt, moving the pitch change links 208 up and down cyclically as they rotate with the drive shaft. This tilts the thrust vector of the rotor, causing rotorcraft 100 to translate horizontally following the direction the swashplate is tilted, Thus, the thrust of the rotor may be increased or decreased, causing the rotorcraft 100 to ascend or descend.

Figure 3A:
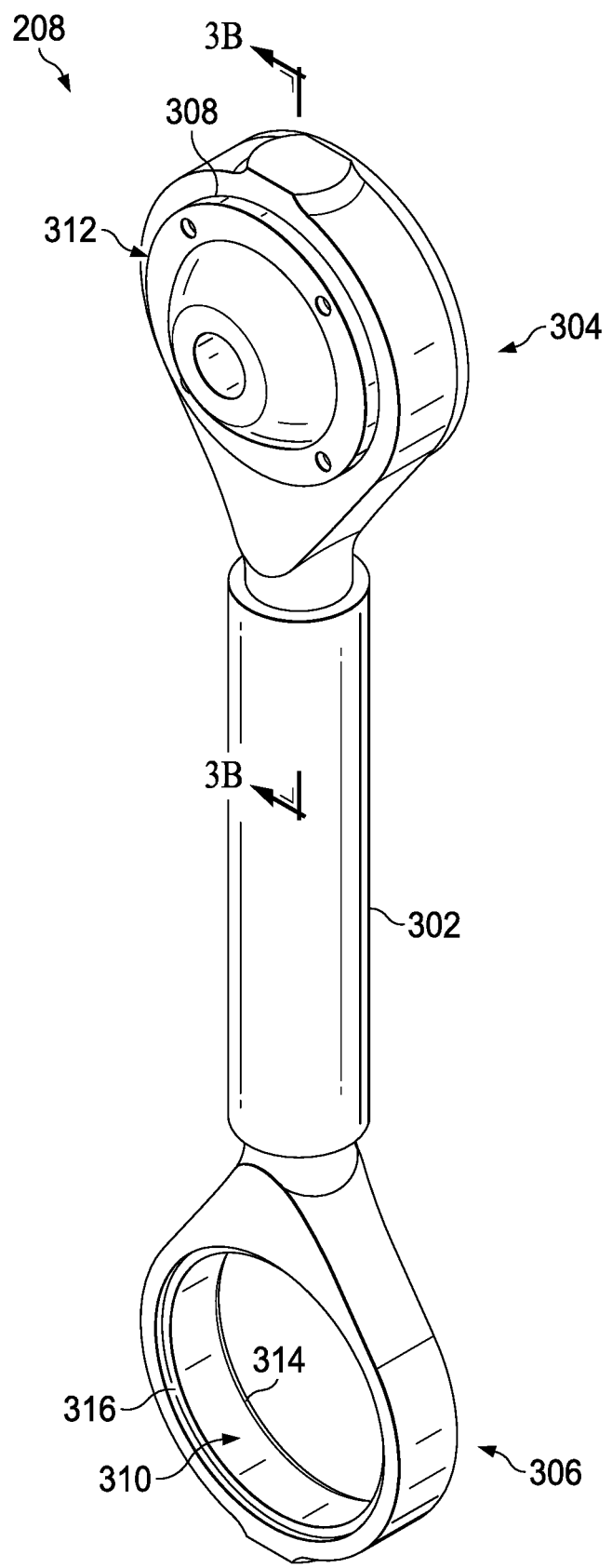
FIG. 3A illustrates a pitch change link and bearing cartridge.

FIG. 3A illustrates an example implementation of the pitch change link 208. The pitch change link 208 may include a rod 302, a first end region 304 of the rod 302 and a second end region 306 of the rod 302. The first end region 304 and the second end region 304 are on opposing ends of the rod 302. The first end region 304 may define a first receptacle 308 and the second end region 306 may define a second receptacle 310. For the remainder of the present description, discussion of one receptacle may apply equally to the other receptacle.

In some implementations, the rod 302 may be a substantially hollow tube connected to one or both of the first end region 304 and the second end region 306 through a threaded connection. In other implementations, the rod 302 may be a substantially solid tube connected to one or both of the first end region 304 and the second end region 306 through a threaded connection. In yet further implementations, the rod 302 may be hollow or solid and may be integrally connected to one or both of the first end region 304 and the second end region 306.

The first receptacle 308 may be configured to receive and retain a bearing cartridge 312. The first receptacle 308 may have a shape that is substantially similar to an outer shape of the bearing cartridge 312. For example, in some implementations, if the outer shape of the bearing cartridge 312 is circular, the shape of the first receptacle 308 may also be circular. In other implementations, if the outer shape of the bearing cartridge 312 is rectangular, the shape of the first receptacle 308 may also be rectangular. In yet further implementations, if the outer shape of the bearing cartridge 312 is asymmetric, the shape of the first receptacle 308 may also be asymmetric. The outer shape of the bearing cartridge 312 may correspond with the shape of the receptacle 308.

With further reference to FIG. 3A, the receptacle 308 may define various elements that may engage the bearing cartridge 312. For example, a shoulder 314 may be a beveled edge that slants away from a center of the receptacle 308 along an edge of the receptacle 308. The shoulder 314 may be provided to prevent the bearing cartridge 312 from inadvertently slipping through the receptacle. Therefore, the bearing cartridge 312 may rest on the shoulder 314. A pitch change link recess 316 may be provided on a side of the receptacle opposing the shoulder 314.

Figure 3B:
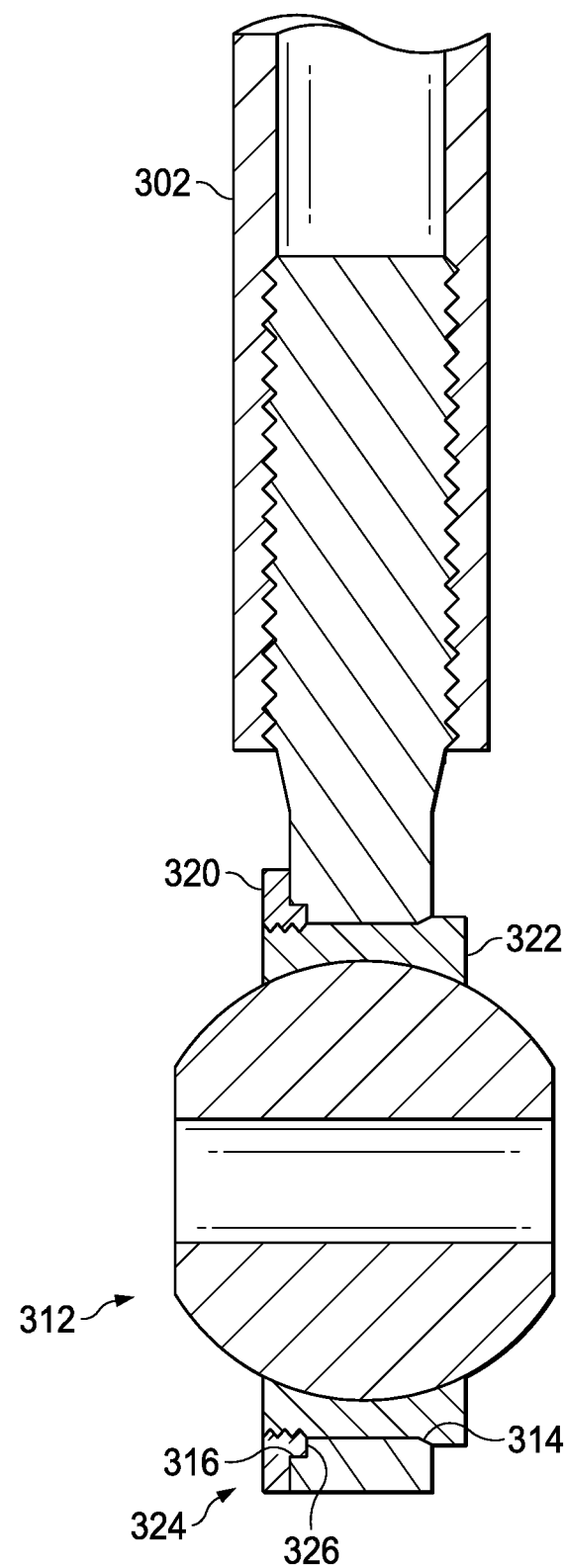
FIG. 3B illustrates a cross-sectional view of a section of the pitch change link of FIG. 3A.

FIG. 3B illustrates a cross-sectional view of the first end region 304 including the bearing cartridge 312. The pitch change link recess 316 may be provided on an edge 320 of the receptacle 308 that opposes an edge 322 that includes the shoulder 314. The pitch change link recess 314 may engage a spanner nut 324. For example, the spanner nut 324 may include a flange 326 that matingly engages the pitch change link recess 316, i.e., the flange 326 engages the pitch change link recess 316 by being inserted into the pitch change link recess 316.

Figure 4A:
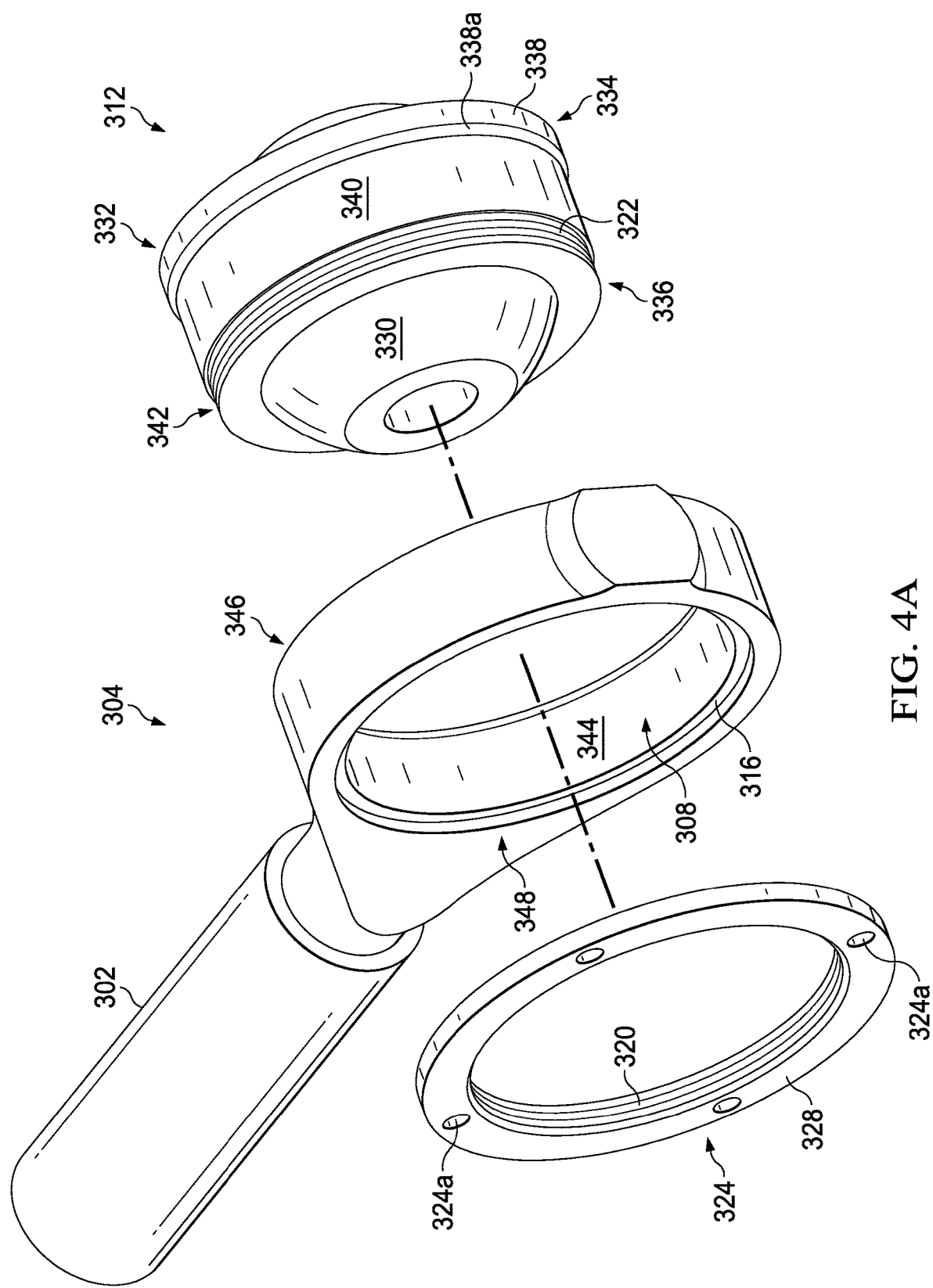
FIG. 4A illustrates a first exploded view of the first end region of the pitch change link.
Figure 4B:
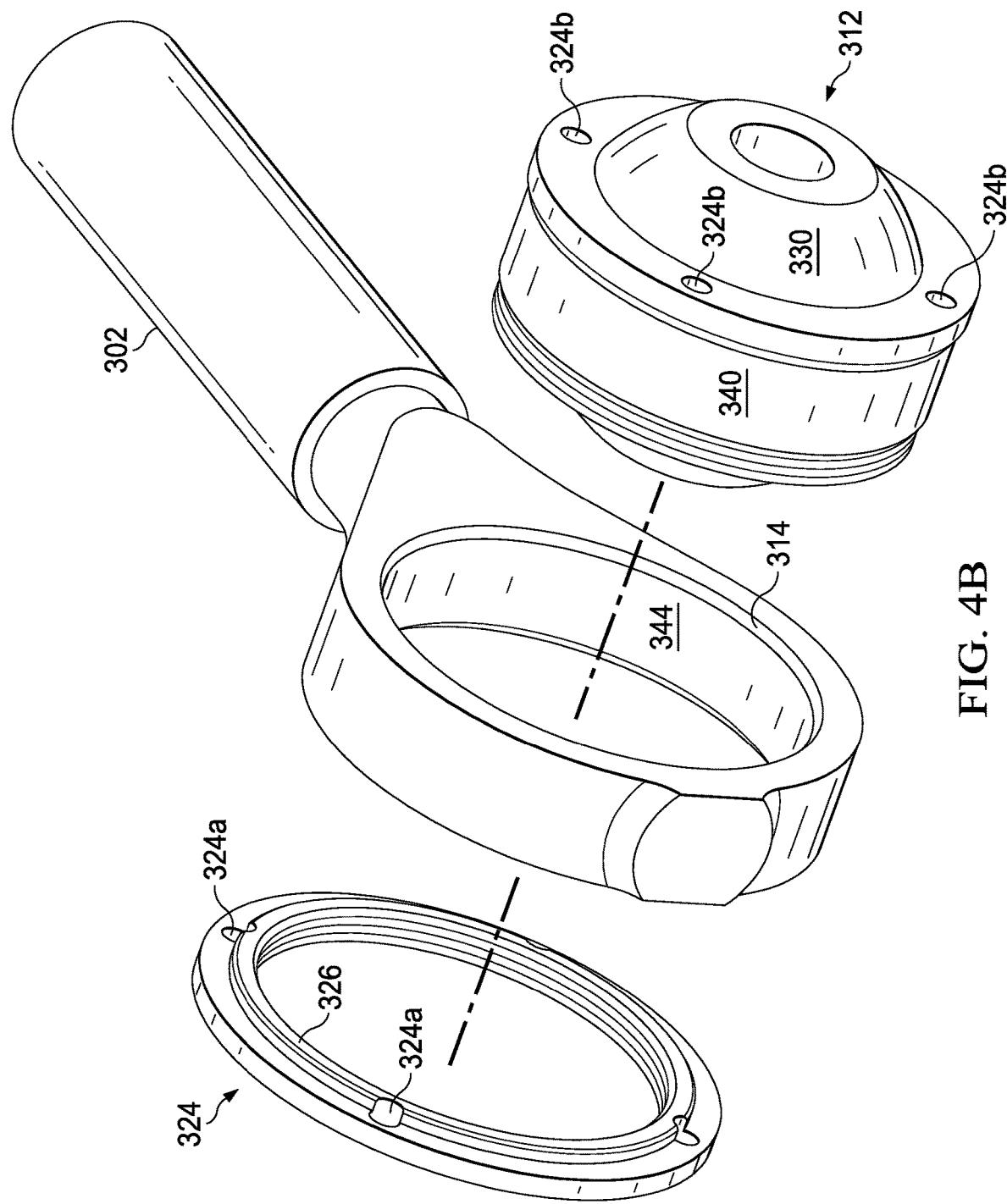
FIG. 4B illustrates a second exploded view of the first end region of the pitch change link.

FIGS. 4A and 4B illustrate an exploded view of the first end region 304 of the pitch change link 208. As illustrated in FIGS. 4A and 4B, the spanner nut 324 may be applied to the first receptacle 308 to help retain the bearing cartridge 312 in the receptacle 308. For example, the flange 326 may protrude into the pitch change link recess 316 of the receptacle 308 and include a first fastener 320 that engages a second fastener 322 on the bearing cartridge 312. The fasteners 320 and 322 may be, for example, threaded fasteners, a tab and slot fastener, a ball bearing and recess fastener, etc.

The first fastener 320 and the second fastener 322 may be configured so that the spanner nut 324 engages the bearing cartridge 312 in two different positions. For example, in an implementation in which a threaded fastener is used, one or both of the first fastener 320 and the second fastener 322 may be a threaded fastener with two threads. Terminal points of each of the threads may be a predetermined distance apart from each other. For example, the terminal points of the threads may be forty-five degrees apart, sixty degrees apart, ninety degrees apart, etc. Therefore, the bearing cartridge 312 may be inserted into the receptacle 308 in a first configuration and removed from the receptacle 308 and replaced in a second configuration forty-five degrees apart, sixty degrees apart, ninety degrees apart, etc., from the first configuration. In some implementations, the bearing cartridge 312 may be inserted into the receptacle 308 in a first configuration and, without being removed from the receptacle 308, rotated to a second configuration, forty-five degrees apart, sixty degrees apart, ninety degrees apart, etc. by rotating the spanner nut 324, which may remain rotatably locked to the bearing cartridge 312 but released from the receptacle 308.

The bearing cartridge 312 and spanner nut 324 may include a locking feature to maintain anti-rotation and torque of the bearing cartridge 312 and the spanner nut 324 within the first receptacle 308. For example, the locking feature may be a mechanism including a safety wire, a cotter pin, a locking ring, etc. that is fed through a through-hole in the bearing ring 312 and/or the spanner nut 324.

The spanner nut 324 may include at least one spanner nut connector receptacle 324a in a rim 328 of the spanner nut 324. Further, the bearing cartridge 312 may include at least one bearing cartridge connector receptacle 324b. The spanner nut connector receptacle 324a and the bearing cartridge connector receptacle 324b may be configured to allow access of a release tool in the pitch change link to release the bearing cartridge 312 from the first receptacle 308. For example, a first spanner wrench (not shown) may engage any of the spanner nut connector receptacles 324a and a second spanner wrench (not shown) may engage any of the bearing cartridge connector receptacles 324b. The spanner wrenches may include pins that engage the receptacles 324a and/or 324b in a male/female configuration. The first spanner wrench may receive a first torque in a first angular direction and the second spanner wrench may receive a second torque in a second angular direction. The first and second angular directions may be opposite each other and the second torque may be a breaking torque to hold the bearing cartridge stationary while the first torque rotates the spanner nut. In some implementations, a first torque may be applied to a spanner nut without a second torque being applied to a bearing. Thus, the spanner nut may be removed from the bearing by rotation of the first spanner wrench relative to the second spanner wrench.

The spanner nut connector receptacles 324a may be configured in the rim 328 to engage the bearing cartridge receptacles 324b in the bearing cartridge 312. Multiple spanner nut connector receptacles 324a (two, four, eight, etc.) may be provided in the rim 328 to allow disengagement of the spanner nut 324 from the bearing cartridge 312 and repositioning of the spanner nut 324 relative to the bearing cartridge 312. Thus, a first of the multiple spanner nut connector receptacles 324a that was aligned with a bearing cartridge connector receptacle 324b in a first configuration may be aligned with a different bearing cartridge connector receptacle 324b (or no receptacle at all) in a second configuration. A second spanner nut connector receptacle 324a that was aligned with a corresponding bearing cartridge connector receptacle 324b (or no receptacle at all) in a first configuration may be aligned with the bearing cartridge connector receptacle 324b that was previously aligned with the first spanner nut connector receptacle. In some implementations, the bearing cartridge 312 may also contain multiple bearing cartridge connector receptacles 324b.

With further reference to FIGS. 4A and 4B, the bearing cartridge 312 is illustrated. The bearing cartridge 312 may include a ball bearing 330 and a bearing ring 332. The ball bearing 330 may fit inside the bearing ring and be held in place by an intimate fit with the bearing ring 332. The spanner nut 324 may have a perimeter that corresponds to a geometry of the receptacle 308.

The bearing ring 332 may be secured to the spanner nut 324 by any type of fastener. The fastener may be a releasable fastener. For example, the first fastener 320, i.e., spanner nut threads, may engage the second fastener 322, i.e., bearing ring threads, on the bearing ring 332.

The bearing ring 332 may have a diameter (which may also be "width" in implementations having a non-circular bearing ring) that narrows from a first end 334 to a second end 336. For example, a bearing ring rim 338 may be on the first end 334 of the bearing ring 332. The bearing ring rim 338 may protrude outwardly from a center of the bearing ring 332. The bearing ring rim 338 may have a beveled surface 338a that is configured to engage the shoulder 314 of the first receptacle 308.

An intermediate portion 340 of the bearing ring 332 may have a narrower width (i.e., diameter) than a width of the bearing ring rim 338. A bearing ring recess 342 may have a narrower width (i.e., diameter) than a width of the bearing ring rim 340. The bearing ring recess 342 may include the second fastener 322 for engaging the first fastener 320 of the spanner nut 324.

The bearing ring 332 may engage the first receptacle 308 in a nested configuration. For example, the beveled surface of the bearing ring 332 may correspond with the beveled surface of the shoulder 314 in combination with a surface 344 of the first receptacle 308. To further promote a nested configuration of the bearing ring 332 in the first receptacle, the surface 344 of the first receptacle may be slanted inward from a first receptacle end 346 toward a second receptacle end 348.

Figure 5:
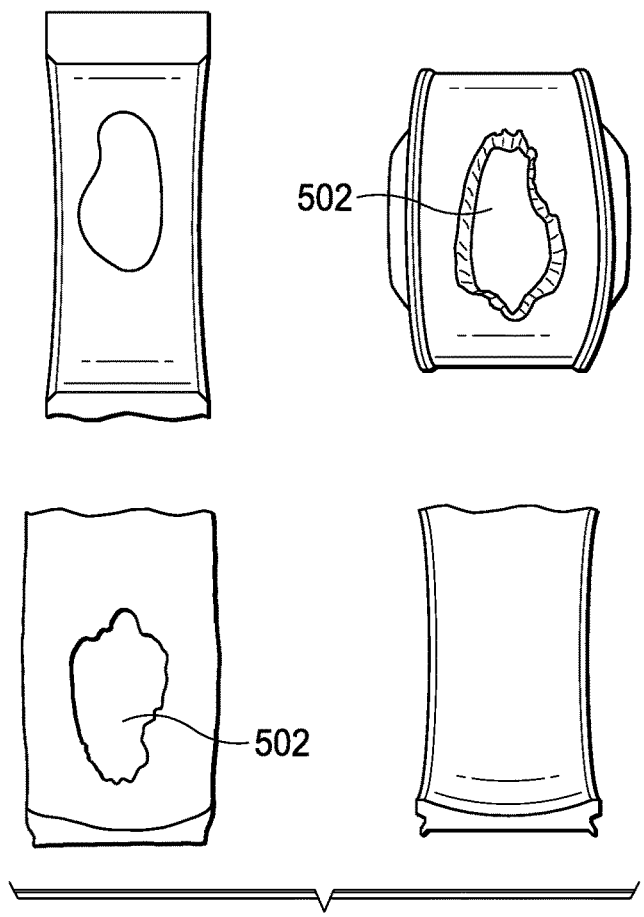
FIG. 5 illustrates wear in a prior art bearing liner.

As illustrated in FIG. 5, a prior art pitch change link may experience wear at opposing sides of a bearing ring, which leads to failure at point 502 of a bearing ring. To reduce friction and thus delay failure of the bearing ring, the bearing ring previously primarily relied on a Teflon® liner that may be about an eighth of an inch thick. In implementations of the present disclosure, delay of failure is further provided by engaging, repositioning and re-engaging the bearing cartridge in a pitch change link receptacle. Therefore, primary stress on the bearing liner is applied to a different point on the bearing liner.

Figure 6:
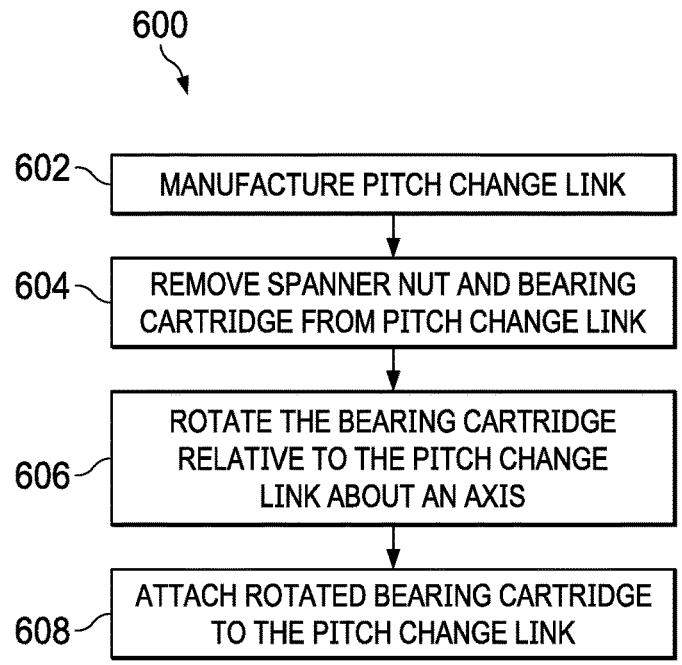
FIG. 6 illustrates a method of extending service life of a pitch change link.

FIG. 6 illustrates a method 600 of extending the life of the pitch change link. The method 600 may include, at step 602, manufacturing a pitch change link having a bearing cartridge as described above. At step 604, the method may include removing the spanner nut and the bearing cartridge from the first or second receptacle of the pitch change link. At step 606, the method may include rotating the bearing cartridge relative to the pitch change link about an axis perpendicular to a centerline of the receptacle. At step 608, the method may include attaching the rotated bearing cartridge to the pitch change link by reinserting the bearing cartridge back into the receptacle.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential.

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementation.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pitch change link comprising:
   a shaft having a first end region and a second end region; and
   a bearing cartridge on at least one of the first end region and the second end region, the bearing cartridge having:
      a bearing; and
      a bearing ring at least partially surrounding the bearing, the bearing ring having geometric symmetry and having a cross section that is wider at a first end than at a second end, the first end region opposing the second end region; and
      wherein the bearing comprises bearing ring threads on an exterior surface thereof.

2. The pitch change link as recited in claim 1, wherein the bearing ring defines a plurality of connector receptacles spaced no more than about ninety degrees apart from each other.

3. The pitch change link as recited in claim 2, wherein the defined plurality of connector receptacles is no more than about sixty degrees apart from each other.

4. The pitch change link as recited in claim 1, wherein the bearing ring includes a rim substantially circumferencing the first end region.

5. The pitch change link as recited in claim 4, wherein the bearing ring defines a bearing ring recess substantially circumferencing the second end.

6. The pitch change link as recited in claim 5, wherein at least one of the first end region and the second end region defines a receptacle configured to engage the bearing cartridge.

7. The pitch change link as recited in claim 6, wherein a cross-section of the defined receptacle is wider at a first receptacle end than at a second receptacle end, the first receptacle end opposing the second receptacle end.

8. The pitch change link as recited in claim 7 wherein the bearing cartridge is in contact with the defined receptacle in a nested configuration.

9. The pitch change link as recited in claim 6, wherein at least one of the first end region and the second end region includes a shoulder projecting into the defined receptacle and substantially circumferencing the defined receptacle and wherein at least one of the first end region and the second end region further defines a pitch change link recess substantially circumferencing the defined receptacle.

10. The pitch change link as recited in claim 9, further comprising:
    a spanner nut including a first fastener;
    wherein the bearing ring includes a second fastener configured to mate with the first fastener.

11. The pitch change link as recited in claim 10, wherein the first fastener engages the defined pitch change link recess and the shoulder engages the bearing ring recess.

12. A bearing cartridge comprising:
    a bearing; and
    a bearing ring at least partially surrounding the bearing, the bearing ring having a geometric symmetry and having a cross section that is wider at a first end than at a second end, the first end opposing the second end, wherein the bearing comprises bearing ring threads on an exterior surface thereof.

13. The bearing cartridge as recited in claim 12, wherein the bearing ring defines a plurality of connector receptacles spaced no more than about ninety degrees apart from each other.

14. The bearing cartridge as recited in claim 13, wherein the defined plurality of connector receptacles is no more than about sixty degrees apart from each other.

15. The bearing cartridge as recited in claim 12, wherein the bearing ring includes a rim substantially circumferencing the first end.

16. The bearing cartridge as recited in claim 12, wherein the bearing ring defines a bearing ring recess substantially circumferencing the second end.

17. A method of increasing life of a bearing cartridge for a pitch change link comprising:
    manufacturing a pitch change link having the bearing cartridge, the bearing cartridge having:
       a bearing; and a bearing ring at least partially surrounding the bearing, the bearing ring having geometric symmetry and having a cross section that is wider at a first end than at a second end, the first end opposing the second end;
unlocking the bearing cartridge from the pitch change link;
rotating the bearing cartridge relative to the pitch change link; and locking the rotated bearing cartridge to the pitch change link.

18. The method of claim 17, wherein the bearing cartridge is rotated about ninety degrees relative to the pitch change link.

19. The method of claim 17, wherein the rotated bearing ring is at least partially worn.

20. The method of claim 19, wherein the bearing ring of the rotated bearing cartridge includes at least two localized wear locations and wherein the localized wear locations are no greater than about ninety degrees apart from each other.

* * * * *